United States Patent
Si et al.

(10) Patent No.: US 11,741,265 B2
(45) Date of Patent: Aug. 29, 2023

(54) PERMISSION DISPLAY METHOD, PERMISSION DISPLAY APPARATUS AND STORAGE MEDIUM

(71) Applicant: BEIJING XIAOMI MOBILE SOFTWARE CO., LTD., Beijing (CN)

(72) Inventors: Mengyu Si, Beijing (CN); Jingcheng Zhang, Beijing (CN); Dong Li, Beijing (CN); Le Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/187,457

(22) Filed: Feb. 26, 2021

(65) Prior Publication Data
US 2021/0390212 A1    Dec. 16, 2021

(30) Foreign Application Priority Data
Jun. 12, 2020 (CN) .......................... 202010538032.2

(51) Int. Cl.
| | |
|---|---|
| G06F 21/62 | (2013.01) |
| G06F 9/451 | (2018.01) |
| G06F 21/10 | (2013.01) |
| G06F 21/44 | (2013.01) |
| G06F 21/83 | (2013.01) |

(52) U.S. Cl.
CPC ........ G06F 21/6281 (2013.01); G06F 21/629 (2013.01); G06F 21/83 (2013.01)

(58) Field of Classification Search
CPC .... G06F 21/6281; G06F 21/629; G06F 21/83; G06F 21/105; G06F 21/44; G06F 9/451
See application file for complete search history.

(56) References Cited

U.S. PATENT DOCUMENTS

| | | | | |
|---|---|---|---|---|
| 2017/0011215 A1* | 1/2017 | Poiesz | ................ | G06F 21/6209 |
| 2018/0203984 A1* | 7/2018 | Grigera | ................ | G06F 21/30 |
| 2019/0138698 A1* | 5/2019 | Qiu | ................ | G06F 21/121 |
| 2019/0138741 A1* | 5/2019 | Lee | ................ | H04W 12/08 |
| 2021/0390171 A1* | 12/2021 | Yuan | ................ | G06F 21/629 |

OTHER PUBLICATIONS

Android Permissions: User Attention, Comprehension, and Behavior, by Ha et al., published 2012 (Year: 2012).*
Extended European Search Report (EESR) in EP 21162709.6 dated Aug. 6, 2021.

(Continued)

Primary Examiner — Vu V Tran
(74) Attorney, Agent, or Firm — Syncoda LLC; Feng Ma (57) ABSTRACT

A permission display method, applied to a terminal, includes: acquiring permission information of an application in response to acquiring permission information of an application in response to runtime permission applied by the application running on the terminal, the permission information including the runtime permission and a permission description corresponding to the runtime permission; and parsing the permission information to obtain the runtime permission and the permission description, and displaying the runtime permission of the application and the permission description on a display interface of the terminal. The permission description can be customized for different applications to realize personalization of the permission description.

20 Claims, 3 Drawing Sheets

(56) References Cited

OTHER PUBLICATIONS

Liu Xueqing et al: "A Large-Scale Empirical Study on Android Runtime-Permission Rationale Messages", 2018 IEEE Symposium on Visual Languages and Human-Centric Computing (VL/HCC), IEEE, Oct. 1, 2018 (Oct. 1, 2018), pp. 137-146, XP033426232.

Alepis Efthimios et al: "Hey Doc, Is This Normal?" Exploring Android Permissions in the Post Marshmallow Era 11, Nov. 22, 2017 (Nov. 22, 2017), ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 53-73, XP047455529, ISBN: 978-3-642-17318-9.

Anonymous: "Request app permissions Android Developers" Jan. 1, 2017 (Jan. 1, 2017), XP055827486.

Liu Xueqing et al: "Mining Android App Descriptions for Permission Requirements Recommendation", 2018 IEEE 26th International Requirements Engineering Conference (RE), IEEE, Aug. 20, 2018 (Aug. 20, 2018), pp. 147-158, XP033420246.

* cited by examiner

PERMISSION DISPLAY METHOD, PERMISSION DISPLAY APPARATUS AND STORAGE MEDIUM

CROSS-REFERENCE TO RELATED APPLICATIONS

This application claims priority to Chinese Patent Application No. 202010538032.2 filed on Jun. 12, 2020, the disclosure of which is hereby incorporated by reference in its entirety.

BACKGROUND

With the development of technologies, more and more applications appear on user terminals. When an application in a terminal invokes another application, it needs to apply for the runtime permission. The advent of this technology has increased the security of the personal information of users who use the terminals, especially those with the ANDROID™ system.

SUMMARY

The present disclosure relates generally to the field of permission management services, and more specifically to a permission display method, a permission display apparatus and a storage medium.

According to a first aspect of embodiments of the present disclosure, there is provided a permission display method, applied to a terminal, including:

acquiring, in response to an application running on the terminal applying for runtime permission, permission information of the application, the permission information including the runtime permission and a permission description corresponding to the runtime permission; and parsing the permission information to obtain the runtime permission and the permission description, and displaying the runtime permission of the application and the permission description on a display interface of the terminal.

In some embodiments, the runtime permission applied by the application includes the permission description, and the acquiring the permission information applied by the application includes:

applying for the runtime permission including the permission description through a permission application system interface, and acquiring the runtime permission including the permission description through the permission application system interface.

In some embodiments, before the displaying the runtime permission of the application and the permission description on the display interface of the terminal, the method further includes:

determining that the permission description meets a permission description requirement of displaying on the display interface.

In some embodiments, the method further includes:

refusing to open a function of displaying the permission description on the display interface, in response to determining that the permission description does not meet the permission description requirement of displaying on the display interface; and displaying the runtime permission of the application on the display interface of the terminal.

In some embodiments, the displaying the runtime permission of the application and the permission description on the display interface of the terminal includes:

displaying the runtime permission of the application and the permission description on the display interface of the terminal in the form of a pop-up box.

According to a second aspect of the present disclosure, there is provided a permission display apparatus, applied to a terminal, including:

an acquiring component configured to acquire, in response to an application running on the terminal applying for runtime permission, permission information of the application, the permission information including the runtime permission and a permission description corresponding to the runtime permission; and a displaying component configured to parse the permission information to obtain the runtime permission and the permission description, and display the runtime permission of the application and the permission description on a display interface of the terminal.

In some embodiments, the runtime permission applied by the application includes the permission description, and the acquiring component is configured to:

apply for the runtime permission including the permission description through a permission application system interface, and acquire the runtime permission including the permission description through the permission application standard interface.

In some embodiments, the displaying component is further configured to:

determine that the permission description meets a permission description requirement of displaying on the display interface.

In some embodiments, the displaying component is further configured to:

refuse to open a function of displaying the permission description on the display interface in response to determining that the permission description does not meet the permission description requirement of displaying on the display interface; and display the runtime permission of the application on the display interface of the terminal.

In some embodiments, the displaying component is configured to:

display the runtime permission of the application and the permission description on the display interface of the terminal in the form of a pop-up box.

According to a third aspect of the present disclosure, there is provided a permission display apparatus including:

a processor; and a memory for storing instructions executable by the processor, wherein, the processor is configured to: execute the permission display method according to the first aspect or any of the embodiments of the first aspect.

According to a fourth aspect of the present disclosure, there is provided a non-transitory computer-readable storage medium, when instructions in the storage medium are executed by a processor of a mobile terminal, the mobile terminal is enabled to execute the permission display method according to the first aspect or any one of the implementations of the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present disclosure. Instead, they are merely examples of devices and methods consistent with aspects related to the present disclosure as recited in the appended claims.

When an application applies to the terminal for permission, a pop-up box displayed on the terminal display interface typically only displays the applying permission, and does not display the description of the permission purpose, or displays the universal unified permission description set by the ANDROID™ system when some of the applications apply for the permission.

The present disclosure takes the ANDROID' system as an example for description. The ANDROID™ system has launched the runtime permission since version 6.0, and when the current application of the terminal needs to invoke another application, it is no longer to grant dangerous permission for the application during being installed, but needs to apply to the user for the permission to use the application, and the user determines whether to grant the permission through the content displayed on the terminal display interface and determines the execution method for granting the application permission by touching the options provided on the terminal display interface. However, when a large number of applications are running, a large amount of permission is applied at the same time, and when the large amount of runtime permission is applied, the terminal does not display the permission description explaining the applying for the runtime permission, which makes the user unclear about the purpose of the runtime permission applied by the application. The user will face the difficulty of unable to use the application when not granting the runtime permission to the application.

In the related technologies, in order to solve the problem that the user is unclear about the purpose of the application applying for the runtime permission, the permission description corresponding to that the application applies for the runtime permission is set in advance in the system. Furthermore, when the currently running application applies for the runtime permission and needs to use another second application, a permission description about using the second application is provided by the terminal system. The second application is an application that the currently running application needs to apply for the runtime permission to invoke, and the following embodiments all use the second application for description. The permission description corresponding to the second application is determined by the terminal system based on the second application that the currently running application applies for invoking, and the permission description set in advance by the terminal system is displayed in the pop-up box for the terminal permission applying. However, the permission description set in advance based on the system is not targeted, and the displayed permission description is single. Therefore, the user still cannot clearly understand the purpose of applying for the permission. For example, if the currently running application of the terminal is a third-party camera application, and the third-party camera application needs to apply for the use of the local camera of the terminal, the third-party camera application initiates an application to the terminal for the runtime permission to use the camera and the system determines that the corresponding permission description is "for taking pictures" based on the runtime permission for applying for the use of the camera and displays "for taking pictures" on the terminal display interface. When a third-party social application needs to use the local camera for video calls and other functions, the third-party social application also applies to the terminal system for the runtime permission for the use of the camera, and similarly, the system determines that the corresponding permission description is "for taking pictures" based on the applying for the runtime permission for the use of the camera and displays "for taking pictures" on the terminal display interface. Apparently, when different applications apply for the use of the same second application, their purposes are different, but due to the permission description provided by the terminal system is used, the permission description displayed on the terminal display interface is the same, which does not match the facts, and thus a more accurate permission description cannot be provided for the user.

Therefore, various embodiments of the present disclosure provide a permission display method in which the application can define the permission description of the applying permission by itself. For example, when the third-party social application applies for the use of the local camera of the terminal, if a photographing function is required, the permission description for the purpose of using the camera currently can be defined as "for taking pictures". If a video call function is required, the permission description for the purpose of using the camera currently can be defined as "for video call". Furthermore, the permission description defined by the application itself can be used as a part of the applying permission, and the permission applying can be made to the terminal system by utilizing the terminal system interface. In this way, there is no need to add new interfaces, and the adaptability is high without fragmentation. according to the permission display method provided in the present disclosure, each application can set corresponding permission descriptions for different purposes. When the runtime permission of the application and the corresponding permission description are displayed in the terminal pop-up box, the user can clearly know the runtime permission applied by the application and the purpose of the runtime permission, and grant the runtime permission to the application. In this way, the personalization of the permission description of the runtime permission of the application can be realized, and the user's terminal experience is improved.

Figure 1:
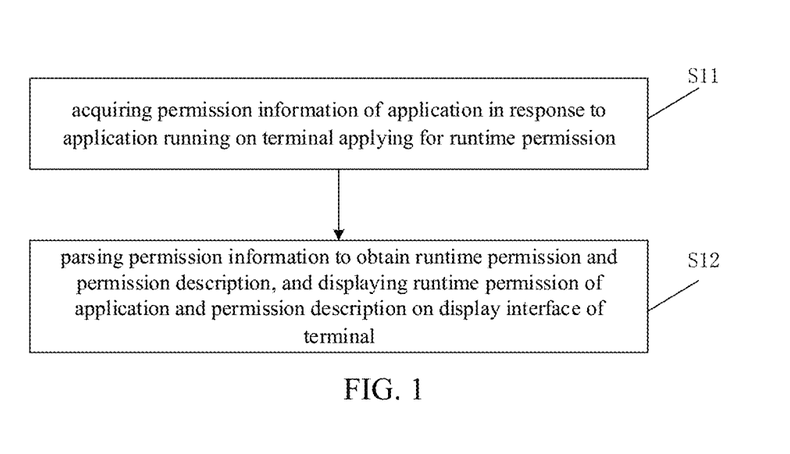
FIG. 1 is a flowchart illustrating a permission display method according to some embodiments.

FIG. 1 is a flowchart illustrating a permission display method according to some embodiments, and as shown in FIG. 1, the permission display method is applied in a terminal, and includes the following steps.

In step S11, permission information of an application is acquired, in response to runtime permission applied by the application running on the terminal, the permission information including the runtime permission and a permission description corresponding to the runtime permission.

In some embodiments of the present disclosure, when the application currently running on the terminal needs to use another application, it applies to the terminal system for the runtime permission, and transmits the permission information of the runtime permission to the terminal system. When the terminal system has received the runtime permission applied by the currently running application, it acquires the permission information of the runtime permission of the application provided by the application to the terminal system. Herein, the permission information includes the runtime permission and the permission description corresponding to the runtime permission.

In some embodiments, the further description is made by taking that the currently running application needs to apply for the use of the camera as an example. The currently running application applies to the terminal system for the use of the camera through the terminal system interface, and sends the permission information of the runtime permission for applying for the use of the camera to the terminal system through the system interface. When the terminal system has received a request for applying for the use of the camera sent from the currently running application, it acquires the permission information of the runtime permission for applying for the use of the camera through the terminal system interface.

In step S12, the permission information is parsed to obtain the runtime permission and the permission description, and the runtime permission of the application and the permission description is displayed on a display interface of the terminal.

In some embodiments of the present disclosure, after obtaining the permission information of the runtime permission provided by the application to the terminal system, the terminal system parses the permission information to obtain the runtime permission and the permission description in the permission information. In order to prevent the application from defining malicious permission descriptions, the terminal system needs to review the obtained permission description based on the permission description requirement set in advance by the terminal system before displaying the permission description on the terminal display interface. After determining that the permission description meets the description requirements set in advance by the system, the runtime permission of the application and the permission description are displayed on the display interface of the terminal. The user can determine whether to grant permission based on the runtime permission of the application and the permission description displayed on the terminal display interface.

In some embodiments, the description is made by taking that the currently running application related to the above-mentioned embodiment requires the use of the camera as an example. The terminal system parses the permission information of the runtime permission for applying for the use of the camera sent from the currently running application, and acquires the permission description in the permission information. For example, if the permission description is "used to publish pictures or video content", the terminal system reviews the obtained permission description content of "used to publish pictures or video content" and determines that "used to publish pictures or video content" meets the description requirements set in advance by the system. Then, the content of "used to publish pictures or video content" is displayed on the display interface of the terminal.

The permission display method involved in the above-mentioned embodiment has realized the personalization of the permission description of the application, and when different applications apply for the runtime permission or the same application applies for different runtime permission, different permission descriptions can be defined.

In some embodiments of the present disclosure, the permission information that the application applies for the runtime permission includes the permission description. In some embodiments, the terminal application sends a runtime permission request to the terminal system through the permission applying terminal system interface, and uses the permission information of the runtime permission as a part of the runtime permission, to send together to the terminal system through the terminal system interface. Because the runtime permission of the application includes the permission description, the terminal system obtains the runtime permission of the application and the permission information of the runtime permission through the permission applying terminal system interface based on the runtime permission request applied by the application, and then obtains the permission description. It can be known from the above-mentioned embodiment that the request for applying for the runtime permission is sent and the permission information of the runtime permission for applying for the use of the camera is obtained, through the terminal system interface, it does not need to add new interfaces, and can be compatible with any version of the terminal system. It will not cause fragmentation.

The permission description included in the runtime permission of the application is obtained based on the terminal system in the above-mentioned embodiment. The terminal system also needs to review the obtained permission description according to the preset permission description requirements. If it is determined that the permission description meets the permission description requirement of displaying on the display interface, the terminal system sends an instruction to display the permission description to open the function of displaying the permission description on the display interface to the application, and displays the runtime permission of the application and the permission description on the display interface of the terminal.

In some embodiments, if it is determined that the permission description does not meet the permission description requirement of displaying on the display interface, the terminal system sends an instruction to refuse displaying the permission description, and denies opening the function of displaying the permission description on the display interface to the application. The currently running application in the above-mentioned embodiment will be described by is taking the camera as an example. If the terminal system judges that the "used to publish pictures or video content" does not meet the predetermined description requirements according to the predetermined description requirements, it denies opening the function of displaying the permission description on the display interface.

Furthermore, because the terminal system denies opening the function of displaying the permission description on the display interface, the runtime permission of the application is displayed on the terminal display interface. Therefore, in some embodiments of the present disclosure, even if the permission information that the currently running application applies for the use of the camera includes the permission description, if the permission description fails the review of the terminal system, it cannot be displayed on the display interface of the terminal.

In the above-mentioned permission display method, the terminal system reviews the permission description, which prevents malicious permission descriptions from being displayed on the terminal interface, thereby improving the user terminal experience.

In some embodiments of the present disclosure, when the runtime permission of the application and the permission description or the runtime permission of the application are displayed on the terminal display interface, they are displayed on the terminal display interface in the form of a pop-up box. The terminal displays the runtime permission and the permission description or the runtime permission of the application in the form of pop-up boxes, and users can make a judgment based on the runtime permission and the permission description displayed on the terminal display interface. By displaying in the form of a pop-up box, not only the runtime permission and the permission description can be displayed, but also the currently running application is not affected. The continuity of the use of the currently running application is ensured.

The following embodiments of the present disclosure further illustrate the permission display method in conjunction with the implementation processes.

Figure 2:
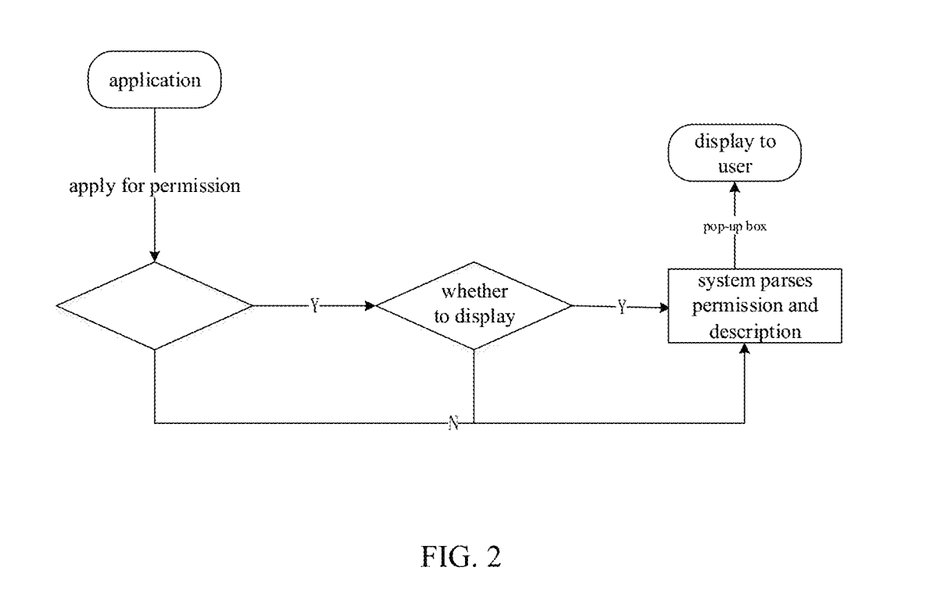
FIG. 2 is a schematic diagram illustrating an implementation process of a permission display method according to some embodiments.

Various embodiments of the present disclosure take that the currently running application is the Xiaomi community, and the applied runtime permission for use is the camera as an example for description. FIG. 2 is a schematic diagram illustrating an implementation process of a permission display method according to some embodiments. As shown in FIG. 2, the currently running application Xiaomi community applies for the use of the camera to the terminal system through the interface of the terminal system, and transmits the permission information that the Xiaomi community applies for the use of the camera into the terminal system through the system interface. In response to the instruction of the application for the use of the camera sent by the Xiaomi community, the terminal system obtains the permission information that the Xiaomi community applies for the use of the camera through the terminal system interface. After the terminal system obtains the permission information that the Xiaomi community applies for the use of the camera, it further parses the permission information that the Xiaomi community applies for the use of the camera, and obtains the runtime permission of the Xiaomi community and the permission description corresponding to the runtime permission. Herein, the runtime permission of the Xiaomi community is "take photos and record videos". The permission description is "used to publish pictures or video content."

Figure 3:
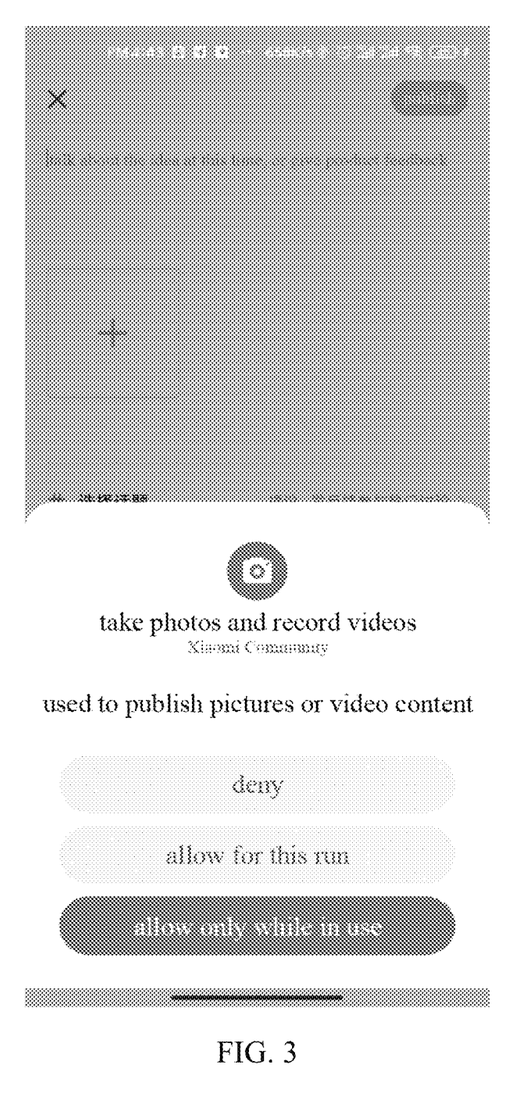
FIG. 3 is a schematic diagram illustrating displaying runtime permission of the application and a permission description in a permission display method according to some embodiments.

The terminal system acquires the parsed permission description of "used to publish pictures or video content", and reviews the "used to publish pictures or video content" based on the permission description requirements set in advance by the terminal system. After the permission description of "used to publish pictures or video content" passes the review of the terminal system, it is confirmed that the "used to publish pictures or video content" can be displayed, and the function of displaying the permission description on the display interface is opened. The terminal system further parses and determines the runtime permission and the permission description corresponding to the runtime permission, and displays the "used to publish pictures or video content" on the terminal display interface. FIG. 3 is a schematic diagram illustrating displaying runtime permission of the application and a permission description in a permission display method according to some embodiments. As shown in FIG. 3, the runtime permission of the Xiaomi community of "take photos and record videos" and the permission description of "used to publish pictures or video content" are displayed on the display interface of the terminal in the form of a pop-up box. At the same time, the content displayed in the pop-up box also includes permission-granting options for the applying permission. Herein, the permission-granting options for the applying permission can include refuse, allow for this run, allow only while in use, etc. The user obtains that the runtime permission of the Xiaomi community is "take photos and record videos" through the terminal display interface. For the information with the permission description being "used to publish pictures or video content", and the corresponding permission-granting options for the applying permission, one of refuse, allow for this run, allow only while in use is selected by tough on the terminal display interface, based on the user's own needs, as a running way to grant the Xiaomi community the applying runtime permission.

Based on the similar concept, some embodiments of the present disclosure also provide a permission display apparatus.

It can be understood that, in order to implement the above functions, the permission display apparatus provided by some embodiments of the present disclosure includes a corresponding hardware structure and/or software components for executing each function. With reference to the units and algorithm steps of the examples disclosed in some embodiments of the present disclosure, the embodiments of the present disclosure can be implemented in the form of hardware or a combination of hardware and computer software. Whether a function is executed through the hardware or a method that the computer software drives the hardware depends on the specific application and design constraints of the technical solution. A person skilled in the art may use different methods to implement the described functions for each specific application, but such implementation should not be considered to exceed the scope of the technical solutions of some embodiments of the present disclosure.

Figure 4:
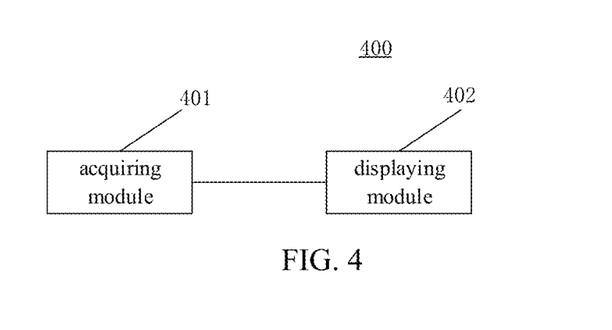
FIG. 4 is a block diagram illustrating a permission display apparatus according to some embodiments.

FIG. 4 is a block diagram illustrating a permission display apparatus 400 according to some embodiments. Referring to FIG. 4, the apparatus includes an acquiring component 401 and a displaying component 402.

The acquiring component 401 is configured to acquire permission information of an application, in response to the runtime permission applied by the application running on the terminal, and the permission information includes the runtime permission and a permission description corresponding to the runtime permission. The display component 402 is configured to parse the permission information to obtain the runtime permission and the permission description, and display the runtime permission of the application and the permission description on a display interface of the terminal.

In some embodiments of the present disclosure, the runtime permission applied by the application includes the permission description, and the acquiring component 401 is configured to apply for the runtime permission including the permission description through a permission application system interface, and acquire the runtime permission including the permission description through the permission application standard interface.

In some embodiments of the present disclosure, the displaying component 402 is further configured to determine that the permission description meets a permission description requirement of displaying on the display interface.

In some embodiments of the present disclosure, the displaying component 402 is further configured to refuse to open a function of displaying the permission description on the display interface, in response to determining that the permission description does not meet the permission description requirement of displaying on the display interface.

In some embodiments of the present disclosure, the displaying component 402 is further configured to display the runtime permission of the application on the display interface of the terminal.

In some embodiments of the present disclosure, the display component 402 is configured to display the runtime permission of the application and the permission description on the display interface of the terminal in the form of a pop-up box.

With respect to the device in the above embodiments, the implementations for performing operations by individual components therein have been described in detail in the embodiments regarding the methods, which will not be elaborated herein.

Figure 5:
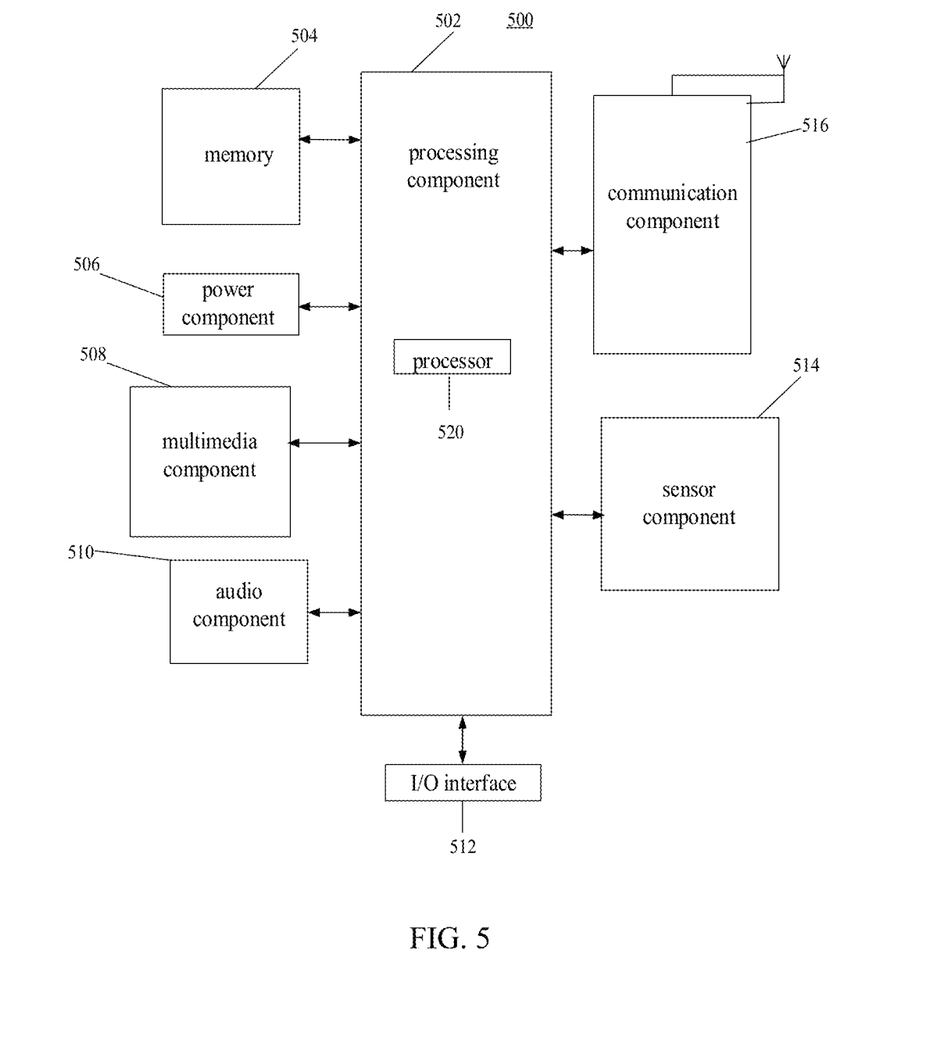
FIG. 5 is a block diagram illustrating a device according to some embodiments.

FIG. 5 is a block diagram illustrating a device 500 for permission display according to some embodiments. For example, the device 500 can be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to implement all or part of the steps in the above-described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, videos, etc. The memory 504 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 supplies power to various components of the device 500. The power component 506 may include a power management system, one or more power sources, and any other components associated with the generation, management, and distribution of power in the device 500.

The multimedia component 508 includes a screen providing an output interface between the device 500 and a user. In some embodiments, the screen may include a liquid crystal display (LCD) and a touch panel (TP). In some embodiments, organic light-emitting diode (OLED) displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also detect a period of time and a pressure associated with the touch or swipe action. In some embodiments, the multimedia component 508 includes a front camera and/or a rear camera. The front camera and/or the rear camera can receive external multimedia data while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 can detect an on/off status of the device 500, relative positioning of components, e.g., the display and a keypad, of the device 500, the sensor component 514 can also detect a change in position of the device 500 or one component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate wired or wireless communication between the device 500 and other devices. The device 500 can access a wireless network based on a communication standard, such as Wi-Fi, 2G, 3G, 4G, or 5G, or a combination thereof. In some embodiments, the communication component 516 receives a broadcast signal or broadcast associated information from an external broadcast management system via a broadcast channel. In some embodiments, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In some embodiments, there is also provided a non-transitory computer-readable storage medium including instructions, such as the memory 504 including the instructions executable by the processor 520 in the device 500, for performing the above-described methods. For example, the non-transitory computer-readable storage medium can be a ROM, a random-access memory (RAM), a CD-ROM, a magnetic tape, a floppy disc, an optical data storage device, and the like.

Various embodiments of the present disclosure can have the following advantages: when applying for the runtime permission, the application takes the permission description as a part of the runtime permission, such that the permission description and the runtime permission are displayed on the display interface of the terminal together. Not only the permission description is displayed in the pop-up box of the terminal, but also the permission description for different applications can be customized to realize the personalization of the permission description.

It will be understood that the "plurality" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," and "the" are also intended to include the plural forms unless the context clearly indicates otherwise.

It will be further understood that although the terms such as "first" and "second" are used to describe various information, this information should not be limited by these terms. The terms are only used to distinguish the same type of information from each other, and do not indicate a specific order or importance. In fact, the expressions such as "first" and "second" can be used interchangeably. For instance, first information can also be referred to as second information without departing from the scope of the disclosure, and similarly, the second information can also be referred to as the first information.

It will be further understood that, unless otherwise specified, "connection" includes a direct connection between the two without other components, and also includes an indirect connection between the two with other elements.

It will be further understood that although the operations in some embodiments of the present disclosure are described in a specific order in the drawings, it will not be understood as requiring that the operations are performed in the specific order shown or in a serial order, or that perform all the operations shown to acquire the desired result. In certain environments, multitasking and parallel processing may be advantageous.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of some embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

Other embodiments of the disclosure will be apparent to those skilled in the art from consideration of the specification and practice of the embodiments disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

What is claimed is:

1. A permission display method, applied to a terminal, the method comprising:
  acquiring, in response to an application running on the terminal applying for runtime permission, permission information of the application, the permission information including the runtime permission and a permission description corresponding to the runtime permission, wherein the permission description is defined by the application itself to set corresponding permission descriptions for different purposes using a particular function; and
  parsing the permission information to obtain the runtime permission and the permission description, and displaying the runtime permission and the permission description of the application on a display interface of the terminal,
  wherein, prior to the displaying the runtime permission of the application and the permission description on the display interface of the terminal, the method further comprises:
  reviewing the obtained permission description based on a permission description requirement set in advance by an operating system of the terminal, and determining that the permission description meets the permission description requirement set in advance;
  opening a function of displaying the permission description on the display interface when it is confirmed that the permission description passes the review; and
  further parsing and determining the runtime permission and the permission description corresponding to the runtime permission, and displaying the permission description on the display interface.

2. The permission display method according to claim 1, wherein the runtime permission applied by the application comprises the permission description, and the acquiring the permission information applied by the application comprises:
  applying for the runtime permission comprising the permission description through a permission application system interface, and acquiring the runtime permission comprising the permission description through the permission application system interface.

3. The permission display method according to claim 1, wherein the displaying the runtime permission of the application and the permission description on the display interface of the terminal comprises:
displaying the runtime permission of the application and the permission description on the display interface of the terminal in the form of a pop-up box.

4. The permission display method according to claim 1, wherein, prior to the displaying the runtime permission of the application and the permission description on the display interface of the terminal, the method further comprises:
determining that the permission description meets a permission description requirement of displaying on the display interface.

5. The permission display method according to claim 4, further comprising:
refusing to open a function of displaying the permission description on the display interface, in response to determining that the permission description does not meet the permission description requirement of displaying on the display interface; and
displaying the runtime permission of the application on the display interface of the terminal.

6. A permission display apparatus, applied to a terminal, the apparatus comprising:
an acquiring component acquires, in response to an application running on the terminal applying for runtime permission, permission information of the application, the permission information including the runtime permission and a permission description corresponding to the runtime permission, wherein the permission description is defined by the application itself to set corresponding permission descriptions for different purposes using a particular function; and
a displaying component parses the permission information to obtain the runtime permission and the permission description, and display the runtime permission and the permission description of the application on a display interface of the terminal,
wherein the displaying component is further:
reviewing the obtained permission description based on a permission description requirement set in advance by an operating system of the terminal, and determine that the permission description meets the permission description requirement set in advance;
opening a function of displaying the permission description on the display interface when it is confirmed that the permission description passes the review; and
further parsing and determining the runtime permission and the permission description corresponding to the runtime permission, and displaying the permission description on the display interface.

7. The permission display apparatus according to claim 6, wherein the runtime permission applied by the application comprises the permission description, and the acquiring component is further:
applying for the runtime permission comprising the permission description through a permission application system interface, and acquire the runtime permission comprising the permission description through the permission application standard interface.

8. The permission display apparatus according to claim 6, wherein the displaying component is further:
displaying the runtime permission of the application and the permission description on the display interface of the terminal in the form of a pop-up box.

9. The permission display apparatus according to claim 6, wherein the displaying component is further:
determining that the permission description meets a permission description requirement of displaying on the display interface.

10. The permission display apparatus according to claim 9, wherein the displaying component is further:
refusing refuse to open a function of displaying the permission description on the display interface in response to determining that the permission description does not meet the permission description requirement of displaying on the display interface; and
displaying the runtime permission of the application on the display interface of the terminal.

11. A permission display device implementing the permission display method according to claim 1, comprising:
a processor; and
memory for storing instructions executable by the processor,
wherein, the processor is configured to execute steps of the permission display method.

12. The permission display device according to claim 11, wherein the runtime permission applied by the application comprises the permission description, and the acquiring the permission information applied by the application comprises:
applying for the runtime permission comprising the permission description through a permission application system interface, and acquiring the runtime permission comprising the permission description through the permission application system interface.

13. The permission display device according to claim 11, wherein, prior to the displaying the runtime permission of the application and the permission description on the display interface of the terminal, the method further comprises:
determining that the permission description meets a permission description requirement of displaying on the display interface.

14. The permission display device according to claim 13, further comprising:
refusing to open a function of displaying the permission description on the display interface, in response to determining that the permission description does not meet the permission description requirement of displaying on the display interface; and
displaying the runtime permission of the application on the display interface of the terminal.

15. A non-transitory computer-readable storage medium having stored thereon instructions that, when executed by a processor of a mobile terminal, causes the mobile terminal to execute operations of the permission display method according to claim 1.

16. The non-transitory computer-readable storage medium according to claim 15, wherein the runtime permission applied by the application comprises the permission description, and the acquiring the permission information applied by the application comprises:
applying for the runtime permission comprising the permission description through a permission application system interface, and acquiring the runtime permission comprising the permission description through the permission application system interface.

17. The non-transitory computer-readable storage medium according to claim 15, wherein the displaying the runtime permission of the application and the permission description on the display interface of the terminal comprises:

displaying the runtime permission of the application and the permission description on the display interface of the terminal in the form of a pop-up box.

18. The non-transitory computer-readable storage medium according to claim 15, wherein, prior to the displaying the runtime permission of the application and the permission description on the display interface of the terminal, the method further comprises:

determining that the permission description meets a permission description requirement of displaying on the display interface.

19. The non-transitory computer-readable storage medium according to claim 18, wherein the method further comprises:

refusing to open a function of displaying the permission description on the display interface, in response to determining that the permission description does not meet the permission description requirement of displaying on the display interface; and displaying the runtime permission of the application on the display interface of the terminal.

20. A mobile terminal implementing the method according to claim 1, comprising:

a display screen configured to display the display interface; and a camera;

wherein the mobile terminal is configured to:

acquire, in response to the application running on the mobile terminal applying for the runtime permission, the permission information of the application, the permission information including the runtime permission and the permission description corresponding to the runtime permission, wherein the permission description is defined by the application itself to set corresponding permission descriptions for different purposes using a particular function;

display the permission description in a pop-up box of the display interface as a part of the runtime permission such that the permission description and the runtime permission are displayed together; and customize the permission description for different applications to realize personalization of the permission description;

wherein the application is a social media application;

when a photographing function is requested, the permission description for a purpose of using the camera is defined as for taking pictures; and when a video call function is requested, the permission description for a purpose of using the camera is defined as for video call;

thereby informing a user of the terminal the runtime permission applied by the social media application and the purpose of the runtime permission, and facilitating the user granting the runtime permission to the social media application;

wherein the mobile terminal is further configured to:

review the obtained permission description based on the permission description requirement set in advance by the mobile terminal, and determine that the permission description meets the permission description requirement set in advance;

open the function of displaying the permission description on the display interface when it is confirmed that the permission description passes the review; and further parse and determine the runtime permission and the permission description corresponding to the runtime permission, and display the permission description on the display interface.

* * * * *